United States Patent
Okazaki et al.

(10) Patent No.: US 10,759,270 B2
(45) Date of Patent: Sep. 1, 2020

(54) CONSTRUCTION MACHINE

(71) Applicant: Yanmar Co., Ltd., Osaka-shi, Osaka-fu (JP)

(72) Inventors: Kohei Okazaki, Chikugo (JP); Umpei Nonaka, Chikugo (JP); Takeshi Takaira, Chikugo (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/080,397

(22) PCT Filed: Jan. 19, 2017

(86) PCT No.: PCT/JP2017/001721
§ 371 (c)(1),
(2) Date: Aug. 28, 2018

(87) PCT Pub. No.: WO2017/149979
PCT Pub. Date: Sep. 8, 2017

(65) Prior Publication Data
US 2019/0193554 A1 Jun. 27, 2019

(30) Foreign Application Priority Data

Feb. 29, 2016 (JP) .................. 2016-037584

(51) Int. Cl.
| B60K 1/00 | (2006.01) |
| B60K 11/06 | (2006.01) |
| B60K 13/02 | (2006.01) |
| F01P 1/06 | (2006.01) |
| F01P 5/06 | (2006.01) |

(Continued)

(52) U.S. Cl.
CPC .............. *B60K 13/02* (2013.01); *E02F 9/00* (2013.01); *E02F 9/0866* (2013.01); *F01P 1/06* (2013.01); *F01P 5/06* (2013.01); *F02B 77/13* (2013.01); *B60K 1/00* (2013.01); *B60K 11/06* (2013.01);

(Continued)

(58) Field of Classification Search
CPC . B60K 13/02; E02F 9/0866; F01P 1/06; F01P 5/06; B60Y 2200/41; B60Y 2306/05
See application file for complete search history.

(56) References Cited

FOREIGN PATENT DOCUMENTS

| JP | 1990-035956 U | 3/1990 |
| JP | 1990035956 U * | 3/1990 |

(Continued)

OTHER PUBLICATIONS

International Search Report dated May 9, 2017 issued in corresponding PCT Application PCT/JP2017/001721.

*Primary Examiner* — Bryan A Evans
(74) *Attorney, Agent, or Firm* — Norton Rose Fulbright US LLP

(57) ABSTRACT

A construction machine in which an electrical unit can be reliably cooled at low cost by effectively utilizing an intake pipe connected to an intake port of an engine. This construction machine includes: an engine; and a hood covering the engine, wherein a space inside the hood has a placement space in which an electrical unit is placed and which communicates with outside air, and a distal-end opening of an intake pipe connected to an inlet port of the engine is disposed in the placement space to cause outside air sucked into the intake pipe due to a suction pressure occurred in the intake pipe to pass through the placement space to form a cooling air path in the placement space.

20 Claims, 11 Drawing Sheets

(51) Int. Cl.
*F02B 77/13* (2006.01)
*E02F 9/00* (2006.01)
*E02F 9/08* (2006.01)

(52) U.S. Cl.
CPC ..... *B60K 2001/003* (2013.01); *B60Y 2200/41* (2013.01); *B60Y 2306/05* (2013.01)

(56) References Cited

FOREIGN PATENT DOCUMENTS

| | | | |
|---|---|---|---|
| JP | 2003-328769 A | | 11/2003 |
| JP | 2004-137883 A | | 5/2004 |
| JP | 2004137883 A | * | 5/2004 |
| JP | 2015-140156 A | | 8/2015 |

* cited by examiner

CONSTRUCTION MACHINE

CROSS REFERENCES TO RELATED APPLICATIONS

This application is a national stage application pursuant to 35 U.S.C. § 371 of International Application No. PCT/JP2017/001721, filed on Jan. 19, 2017, which claims priority under 35 U.S.C. § 119 to Japanese Patent Application No. 2016-037584, filed on Feb. 29, 2016, the disclosures of which are hereby incorporated by reference in their entireties.

TECHNICAL FIELD

The present invention relates to a construction machine, and specifically to a construction machine provided with an electrical unit and a structure for cooling the electrical unit.

BACKGROUND ART

Heretofore, Patent Literatures 1 and 2 (hereinafter, referred to as PTLs 1 and 2) have disclosed, as one embodiment of a construction machine, a structure for cooling an electrical component placed in an engine room. Specifically, PTL 1 discloses a structure in which a compressor is interlocked and coupled to an engine mounted in an engine room. According to this structure, the compressor is driven to compress air sucked thereinto from the outside, and the compressed air discharged from the compressor is blown to an electrical component for cooling the electrical component. PTL 2 discloses a structure in which outside air taken into an intake chamber through an intake duct is blown toward an engine by a blower fan. In addition, an electrical component cover accommodating an electrical component in its inside has an upper portion including an intake hole communicating with the intake chamber and a lower portion including an exhaust hole communicating with the inside of the intake duct. This provides an air flow path for causing air to flow along the electrical component for cooling the electrical component.

CITATION LIST

Patent Literature

PTL 1: Japanese Patent Application Laid-Open No. 2003-328769
PTL 2: Japanese Patent Application Laid-Open No. 2015-140156

SUMMARY OF INVENTION

Technical Problem

Unfortunately, however, the structure according to PTL 1 requires the compressor additionally. Meanwhile, although the structure according to PTL 2 does not require any additional blower fan because the blower fan used to cool the engine is also used to cool the electrical component, designing of the air flow path is complicated, which may lead to an increase in cost. In addition, PTLs 1 and 2 involve disadvantages as below. That is, devices such as an electrical component to be placed in a space inside a hood have a working temperature range that is specified at a certain temperature or lower. However, the space inside the hood often has a high temperature. Thus, in order to place such devices in the space inside the hood while satisfying the working temperature range, a countermeasure is taken by placing the electrical component far from the engine and/or by using a large amount of heat insulating materials to reduce heat conducted to the electrical component. However, the countermeasure by placing the electrical component far from the engine results in a complicated part shape of the electrical component. Consequently, manufacturing cost of the construction machine is greatly affected by the cost of the electrical component, disadvantageously. Meanwhile, the countermeasure by using the heat insulating materials also requires the cost of the heat insulating materials, and thus requires the cost of the heat insulating materials enough to satisfy the temperature range, disadvantageously.

In view of the circumstances described above, some aspects of the present invention have an object to provide a construction machine in which an electrical unit can be reliably cooled at low cost by effectively utilizing an intake pipe connected to an inlet port of an engine.

Solution to Problem

A first aspect of the present invention provides a construction machine including:
an engine; and
a hood covering the engine, wherein
a space inside the hood has a placement space in which an electrical unit is placed and which communicates with outside air, and
a distal-end opening of an intake pipe connected to an inlet port of the engine is disposed in the placement space to cause outside air sucked into the intake pipe due to a suction pressure occurred in the intake pipe to pass through the placement space to form a cooling air path in the placement space.

A second aspect of the present invention is the first aspect of the present invention configured such that
an intake duct having an outside-air inlet port through which outside air is drawn and a communication port disposed downward of the outside-air inlet port is placed in the placement space,
the distal-end opening of the intake pipe is disposed upward of the communication port to form the cooling air path that is circuitous to cause the outside air drawn through the outside-air inlet port to pass through the intake duct, to exit from the intake duct through the communication port, and to be drawn upward into the distal-end opening of the intake pipe, and
the electrical unit is placed in a downstream portion of the cooling air path, the downstream portion being located outside of the intake duct.

A third aspect of the present invention is the second aspect of the present invention configured such that
the placement space is a part of the space inside the hood, the part being partitioned by a partitioning wall serving as an inner wall placed in the space inside the hood and by a part of the hood serving as an outer wall,
the intake duct is shaped in a box which is vertically long in a top-and-bottom direction and which is constituted by a duct main piece placed in the placement space and by a part of the hood serving as an outer side wall,
the outside-air inlet port is formed in the part of the hood serving as the outer side wall so that the outside-air inlet port coincides with an upper portion of the duct main piece,
the communication port is formed in a lower portion of the duct main piece, and the distal-end opening of the intake pipe is penetrated through an upper portion of the partitioning wall to be disposed in the placement space.

A fourth aspect of the present invention is the second or third aspect of the present invention configured such that the communication port is opened toward the electrical unit placed in the placement space.

A fifth aspect of the present invention is any one of the second to fourth aspects of the present invention configured such that the intake duct has a bottom including a draining hole for discharging rainwater having entered the intake duct through the outside-air inlet port.

Advantageous Effects of Invention

According to the aspects of the present invention, it is possible to reliably cool the electrical unit at low cost by effectively utilizing the intake pipe connected to the inlet port of the engine.

DESCRIPTION OF EMBODIMENTS

With reference to the drawings, embodiments of the present invention will be described. The reference sign "A" shown in FIGS. 1 to 3 denotes a construction machine A of the present embodiment. First, an overall configuration of the construction machine A will be described. Thereafter, a characteristic configuration of the construction machine A will be described.

[Description of Overall Configuration of Construction Machine]

Figure 1:
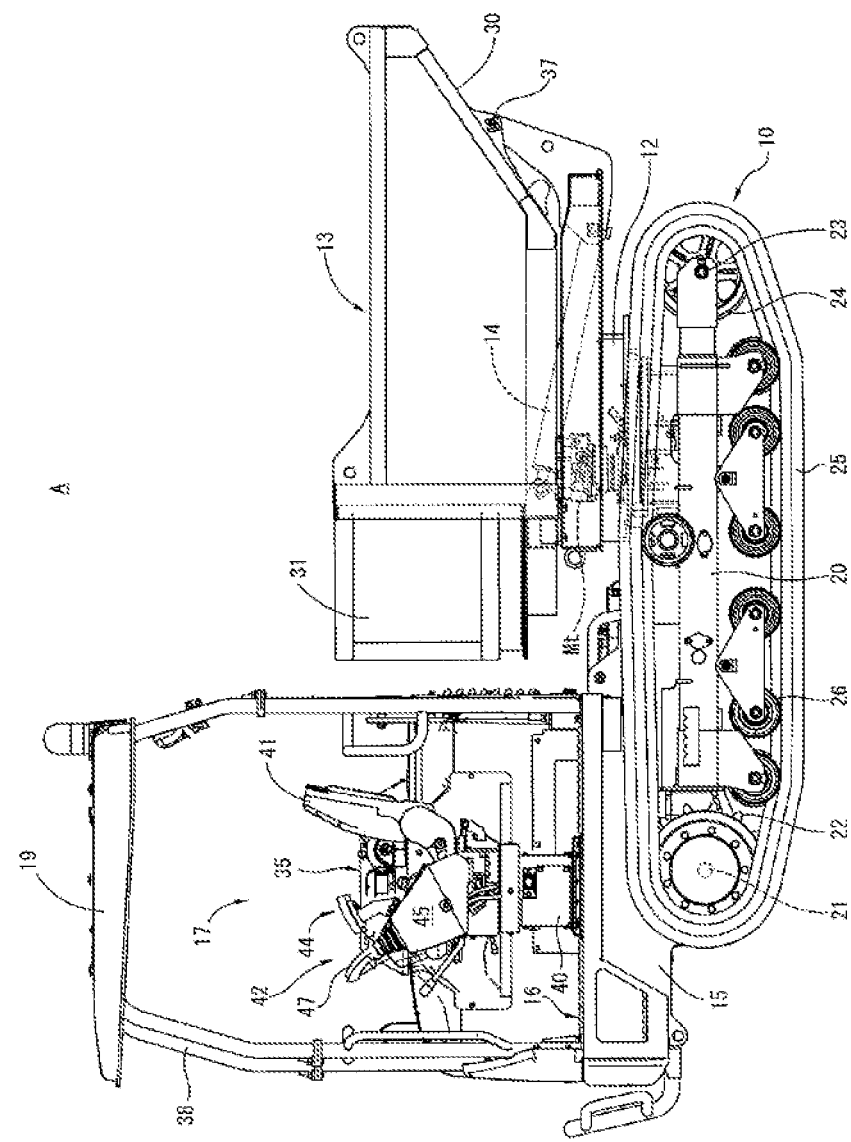
FIG. 1 A left side view of a construction machine according to one embodiment of the present invention.
Figure 2:
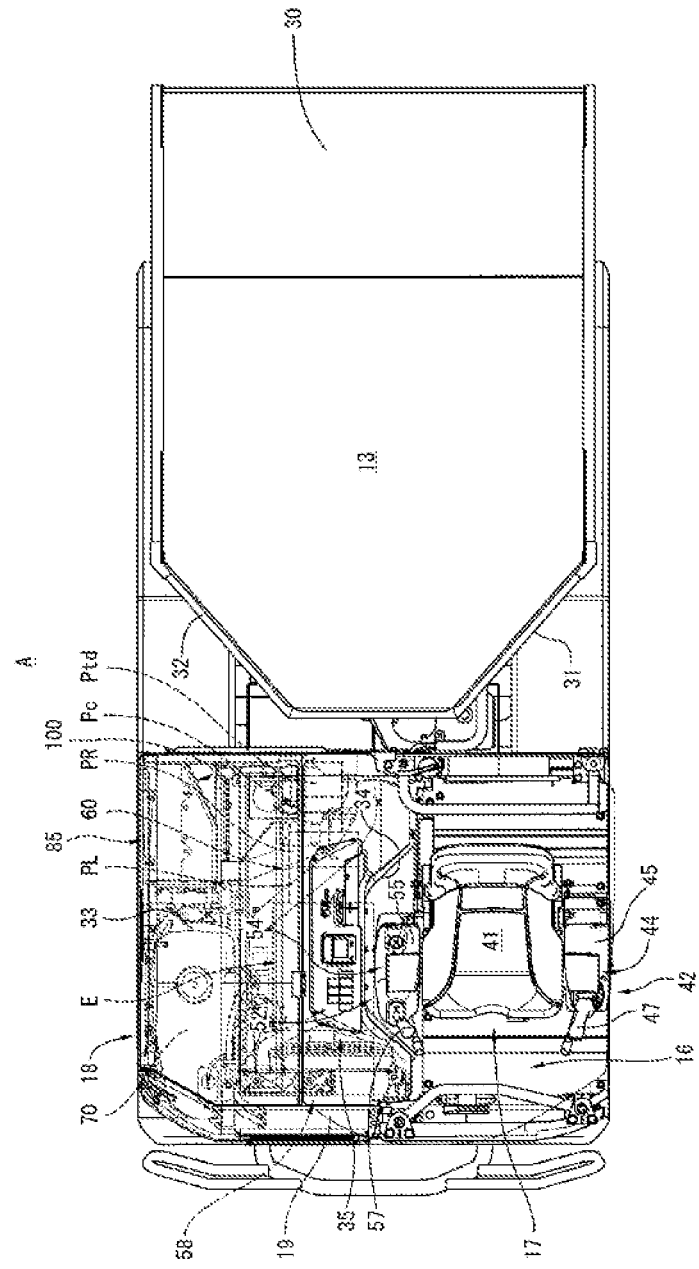
FIG. 2 An explanatory plane view of the construction machine according to the one embodiment of the present invention.
Figure 3:
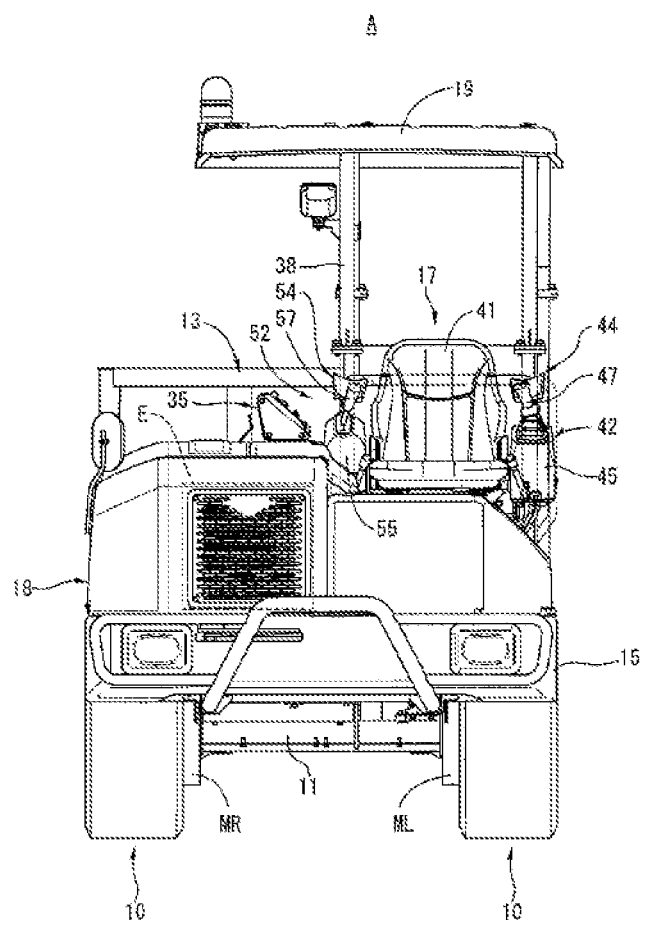
FIG. 3 A front view of the construction machine according to the one embodiment of the present invention.
Figure 4:
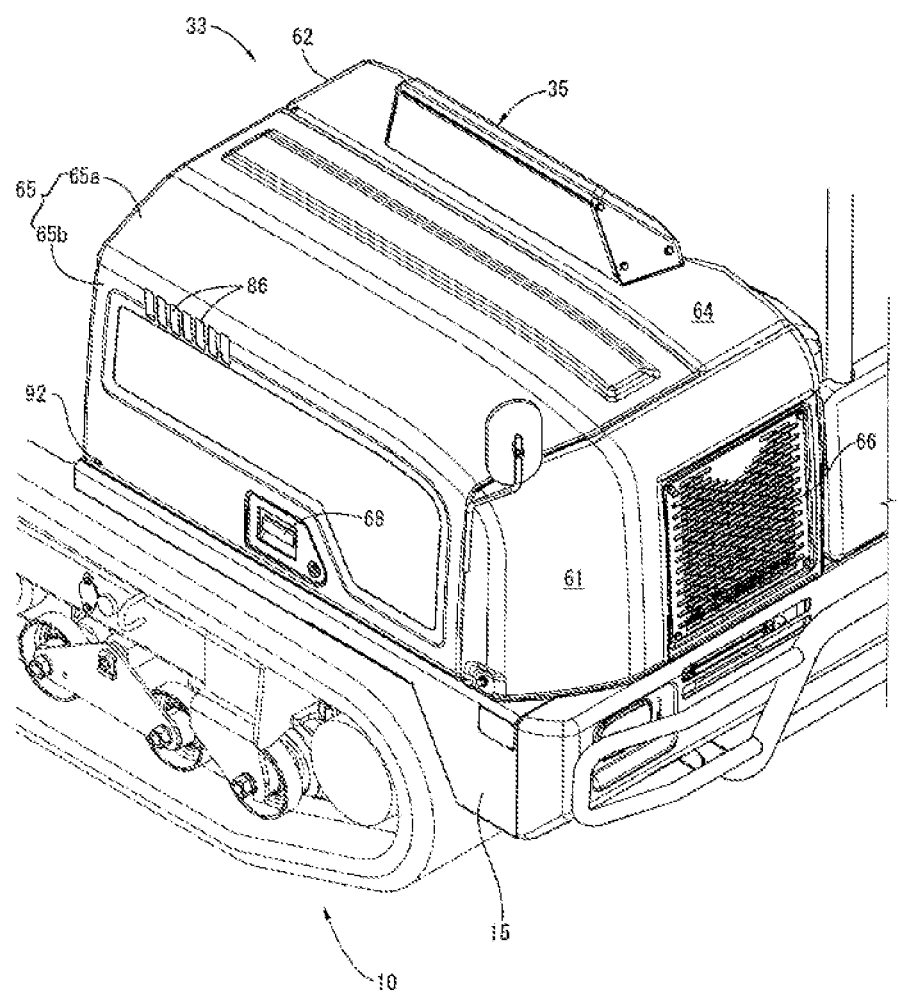
FIG. 4 A perspective view of a prime motor unit according to the one embodiment of the present invention, viewed from the top right.

As illustrated in FIGS. 1 to 3, the construction machine A includes a turning base mount 11 laid across a pair of left and right traveling units 10 of crawler-type. On the turning base mount 11, a turning base 12 is turnably mounted. On the turning base 12, a load carrier 13 is mounted. In addition, a dump cylinder 14 is interposed between the turning base 12 and the load carrier 13 such that the load carrier 13 can be tilted by the dump cylinder 14. The load carrier 13 has a rear lower portion provided with a tilting fulcrum 37 for the load carrier 13. The turning base mount 11 is provided with an overhung machine-body frame 15 extending forward in an overhung state. A floor 16 is spread over a left side of the overhung machine-body frame 15, and an operation unit 17 is mounted on the floor 16. Meanwhile, a prime motor unit 18 is placed on a right side of the overhung machine-body frame 15. A roof 19 is provided vertically above the operation unit 17 via a roof support 38.

The traveling unit 10 on the left side includes a traveling unit frame 20 extending in a front-and-rear direction and having a front end provided with a left hydraulic motor ML for traveling. The left hydraulic motor ML for traveling includes a drive shaft 21 to which a driving wheel 22 is attached. The traveling unit frame 20 has a rear end to which a driven wheel 24 is attached via a driven-wheel support shaft 23. A crawler 25 is wound around the driving wheel 22 and the driven wheel 24. A rolling wheel 26 is attached to an intermediate portion of the traveling unit frame 20 such that the rolling wheel 26 supports the intermediate portion of the crawler 25. The traveling unit 10 on the right side has a similar configuration to that of the traveling unit 10 on the left side, and includes a traveling unit frame 20 having a front end provided with a right hydraulic motor MR for traveling.

By causing the left and right hydraulic motors ML and MR for traveling to rotate in a forward direction, it is possible to cause the machine body to travel forward (to travel leftward in FIG. 1). Meanwhile, by causing the left and right hydraulic motors ML and MR for traveling to rotate in a reverse direction, it is possible to cause the machine body to travel backward (to travel rightward in FIG. 1). By causing the left (right) hydraulic motor ML (MR) for traveling to rotate in the forward direction and stopping the right (left) hydraulic motor MR (ML) for traveling, it is possible to cause the machine body to make a turn (pivot turn) rightward (leftward). By causing the left (right) hydraulic motor ML (MR) for traveling to rotate in the forward direction and causing the right (left) hydraulic motor MR (ML) for traveling to rotate in the reverse direction, it is possible to cause the machine body to make a sharp turn (spin turn) rightward (leftward) at that place.

The turning base mount 11 is provided with a hydraulic motor Mt for turning. The hydraulic motor Mt for turning includes a drive shaft (not illustrated) to which a pinion gear (not illustrated) is attached. The turning base 12 is provided with an annulus gear (not illustrated) engaged with the pinion gear. By causing the drive shaft of the hydraulic motor Mt for turning to rotate in a forward or reverse direction, it is possible to cause the turning base 12 to turn counterclockwise or clockwise as appropriate via the pinion gear and the annulus gear.

The load carrier 13 is shaped in a box opened upward. In addition, the load carrier 13 has, in a rear portion of a bottom of the load carrier 13, an inclined bottom 30 that is lower in the front and higher in the rear. The load carrier 13 has left and right inclined walls 31 and 32, which are located in left and right front portions of the load carrier 13, respectively. Each of the inclined walls 31 and 32 is inclined such that, in a plan view, a front end of the inclined wall is located inward and a rear end of the inclined wall is located outward. With the load carrier 13 having such a shape, it is possible to avoid a collision of the left or right inclined wall 31 or 32 of the load carrier 13 against the operation unit 17 or the prime motor unit 18 when the load carrier 13 is turned leftward or rightward integrally with the turning base 12.

By elongating the dump cylinder 14 with the rear end of the load carrier 13 facing rearward, it is possible to tilt the load carrier 13 rearward about the tilting fulcrum 37. Consequently, a load in the load carrier 13 can be dumped rearward. By turning, by 90 degrees via the turning base 12, the load carrier 13 facing backward, the rear end of the load carrier 13 is caused to face leftward (rightward). By elongating the dump cylinder 14 in this state, it is possible to tilt the load carrier 13 about the tilting fulcrum 37 so that the load carrier 13 is brought into a state in which the left side of the load carrier 13 is lower and the right side of the load carrier 13 is higher (the right side of the load carrier 13 is lower and the left side of the load carrier 13 is higher). Consequently, a load in the load carrier 13 can be dumped leftward (rightward).

The operation unit 17 includes a support case 40 for supporting an operator's seat 41, the support case 40 being located in a center portion of the floor 16. The support case 40 has a left side on which a left control part 42 is attached in a standing manner such that the left control part 42 extends forward and upward. The left control part 42 includes a left control case 45 and a traveling lever 47 protruding forward and upward from an upper end of the left control case 45.

The left control case 45 has an upper surface including an intermediate portion on which a left armrest 44 is attached in a standing manner. The left armrest 44 is located behind the traveling lever 47. The left armrest 44 is configured to allow an operator sitting on the operator's seat 41 to place an elbow-side portion of his/her forearm on the left armrest 44 and to grasp an upper-end grip portion of the traveling lever 47 with his/her hand. Consequently, the operator can tilt the traveling lever 47 forward, rearward, leftward, or rightward.

The support case 40 has a right side on which a right control part 52 is attached in a standing manner such that the right control part 52 extends forward and upward. The right control part 52 includes a right control case 55 and a turning-and-dumping lever 57 protruding forward and upward from an upper end of the right control case 55.

The right control case 55 has an upper surface including an intermediate portion on which a right armrest 54 is attached in a standing manner. The right armrest 54 is located behind the turning-and-dumping lever 57. The right armrest 54 is configured to allow the operator sitting on the operator's seat 41 to place an elbow-side portion of his/her forearm on the right armrest 54 and to grasp an upper-end grip portion of the turning-and-dumping lever 57 with his/her hand. Consequently, the operator can tilt the turning-and-dumping lever 57 forward, rearward, leftward, or rightward.

With such a configuration, the operator sitting on the operator's seat 41 grasps, with his/her left hand, the traveling lever 47 protruding from the left control case 45, and grasps, with his/her right hand, the turning-and-dumping lever 57 protruding from the right control case 55. Thus, the operator can operate the lever 47 and/or 57 as appropriate.

Figure 5:
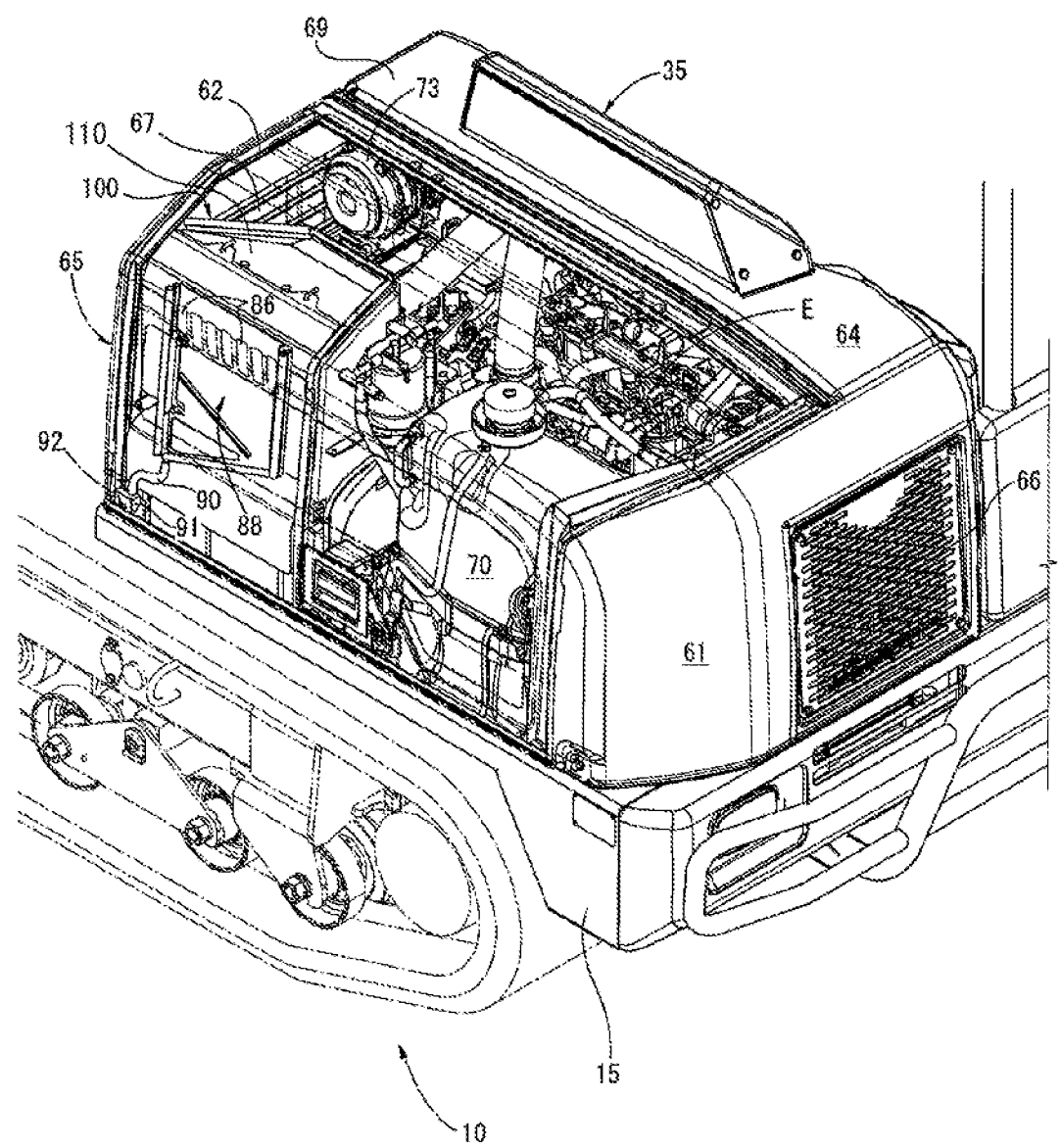
FIG. 5 A perspective view, viewed from the front top right, of the prime motor unit according to the one embodiment of the present invention from which an openable-side ceiling and right side wall is removed.
Figure 6:
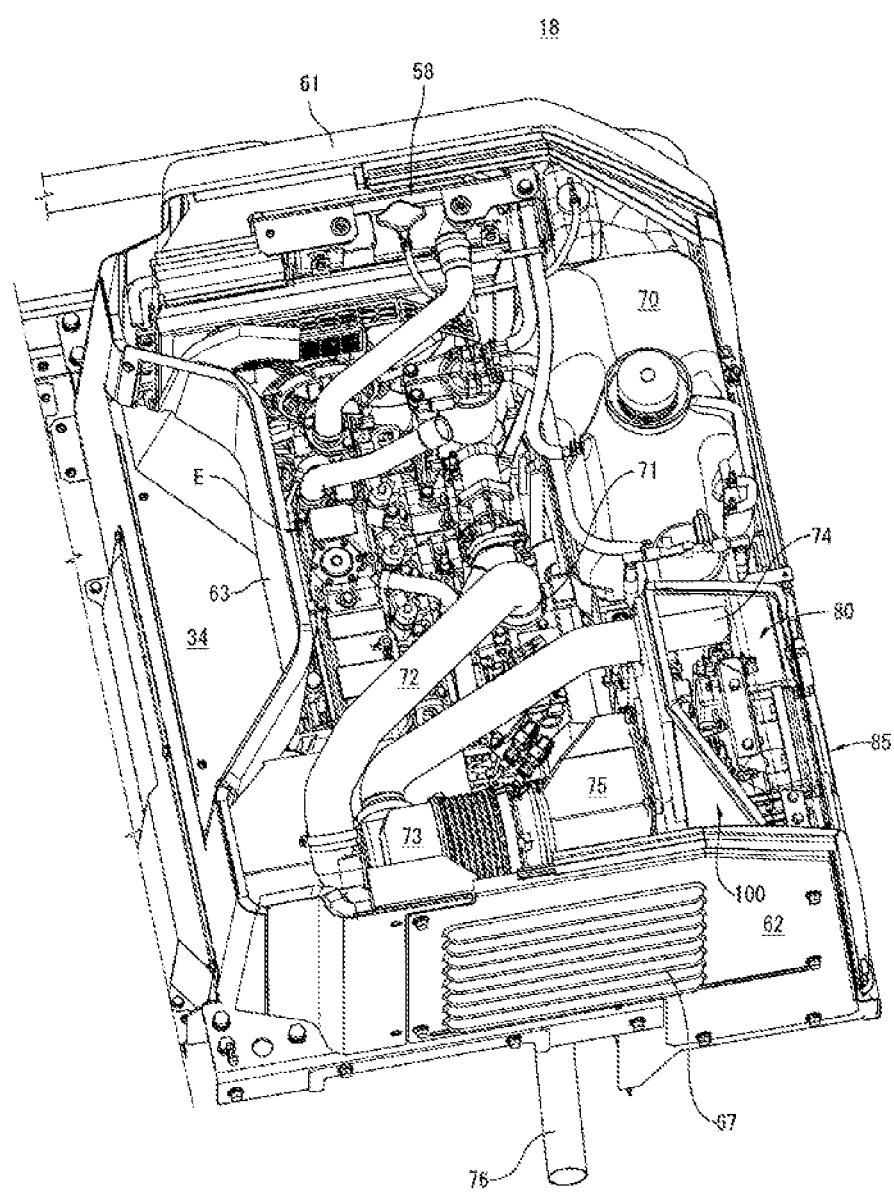
FIG. 6 A perspective view, viewed from the rear top left, of the prime motor unit according to the one embodiment of the present invention from which a fixed-side ceiling wall and the openable-side ceiling and right side wall are removed.

As illustrated in FIGS. 5 and 6, the prime motor unit 18 includes, on a right side portion of the overhung machine-body frame 15, an engine (in the present embodiment, a diesel engine) E, a heat exchange means 58, a group of pumps 60, a fuel tank 70, an electrical unit 80, and the like, which are covered with a hood 33.

As illustrated also in FIG. 6, the engine E is mounted on a portion of the overhung machine-body frame 15, the portion corresponding to a left side portion of a space inside the hood 33. In this portion, the engine E is disposed to extend in the front-and-rear direction. The engine E has an inlet port 71 connected to a proximal end of an intake pipe 72. The intake pipe 72 has an intermediate portion provided with an air cleaner 73. Outside air is sucked through a distal-end opening 74 of the intake pipe 72, and the outside air is then sucked to pass through the air cleaner 73 so that the outside air is cleaned therein. Thereafter, the outside air thus cleaned is supplied to the engine E through the inlet port 71. During this process, a suction pressure (negative pressure) occurs in the intake pipe 72 due to the inlet port 71. This allows the outside air to be sucked through the distal-end opening 74. The engine E has an exhaust port (not illustrated) connected to a proximal end of an exhaust pipe 76. The exhaust pipe 76 has an intermediate portion provided with a diesel particulate filter (DPF) 75 that is an exhaust gas purification device. Particulate matters (PM) in an exhaust gas emitted from the exhaust port of the engine E are collected (caught by filtering) and reduced by a filter integrated in the DPF 75. Thereafter, the exhaust gas is discharged through a distal-end opening of the exhaust pipe 76 to the outside of the hood 33. The filter in the DPF 75 is, e.g., ceramics or a metallic porous body having a large number of holes each having a diameter of approximately 10 micrometers, being capable of removing minute particles by filtering, and having high durability. When the particulate matters (PM) accumulated inside the filter are burnt by high-temperature heat of, e.g., 600° C. or higher, the filter regains its function.

The air cleaner 73 and the DPF 75, which are located behind and above the engine E, are arranged vertically in parallel to each other with their longitudinal directions coinciding with a left-and-right direction. In front of the engine E, the heat exchange means 58 having a heat exchanging function for cooling the engine E is provided. The heat exchange means 58 includes components such as a radiator and a suction fan. The heat exchange means 58 is disposed behind a front grille 66 (described later) such that the heat exchange means 58 faces the front grille 66. The heat exchange means 58 sucks outside air through the front grille 66 by the suction fan interlocked with the engine E, and generates water for cooling the engine E.

As illustrated in FIGS. 1 to 3, the group of pumps 60, which is located behind the engine E, includes a right pump PR for traveling, a left pump PL for traveling, a charging pump Pc, and a pump Ptd for turning and dumping that coupled in series to a drive shaft (not illustrated) of the engine E such that these pumps are interlocked with the drive shaft. The left pump PL for traveling is in fluid connection with the left hydraulic motor ML for traveling via hydraulic piping for traveling (not illustrated), and whereby a hydrostatic continuously variable transmission on the left side is constituted. The right pump PR for traveling is in fluid connection with the right hydraulic motor MR for traveling via hydraulic piping for traveling, and whereby a hydrostatic continuously variable transmission on the right side is constituted. The hydrostatic continuously variable transmissions on the left and right sides are interlocked and connected to the driving wheels 22 of the traveling units 10 on the left and right sides, respectively. The hydrostatic continuously variable transmissions on the left and right sides allow their corresponding traveling units 10 to travel while seamlessly changing speeds of the traveling units 10. The pump Ptd for turning and dumping is in fluid connection with the hydraulic motor Mt for turning and the dump cylinder 14 in parallel via hydraulic piping for turning and dumping (not illustrated).

As illustrated in FIGS. 5 and 6, the fuel tank 70 has a shape being long in the front-and-rear direction and being thin in the left-and-right direction. In addition, the fuel tank 70 is placed on a portion of the overhung machine-body frame 15, the portion corresponding to a front right portion of the space inside the hood 33.

Figure 7:
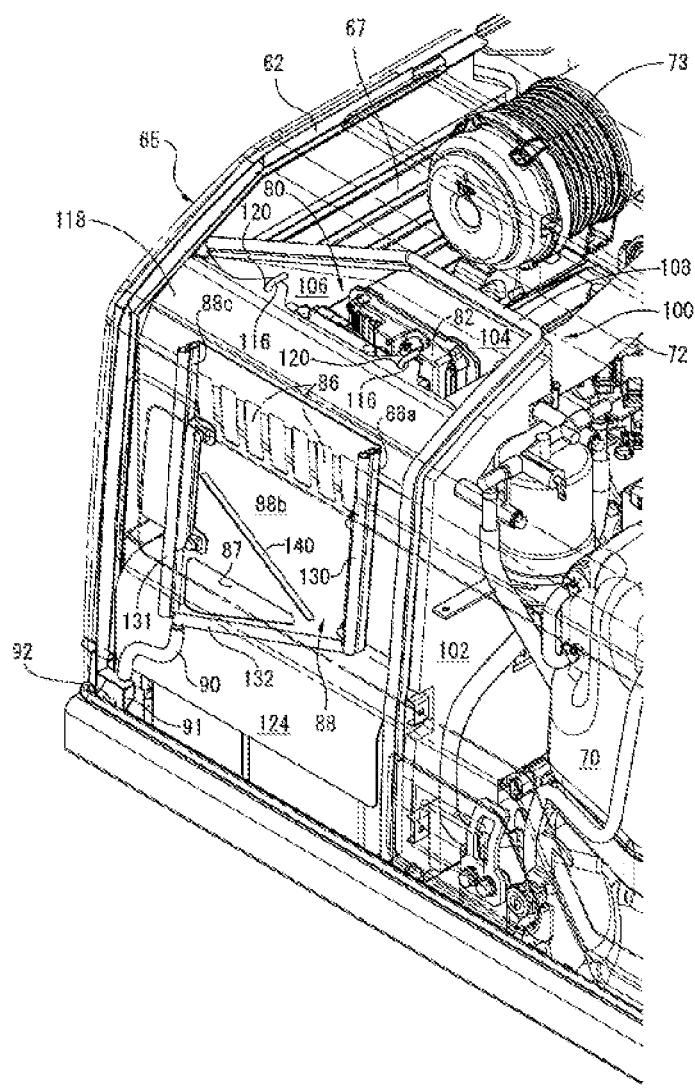
FIG. 7 A perspective view, viewed from the front top right, of a rear right portion of the prime motor unit according to the one embodiment of the present invention from which the fixed-side ceiling wall and the openable-side ceiling and right side wall are removed.
Figure 8:
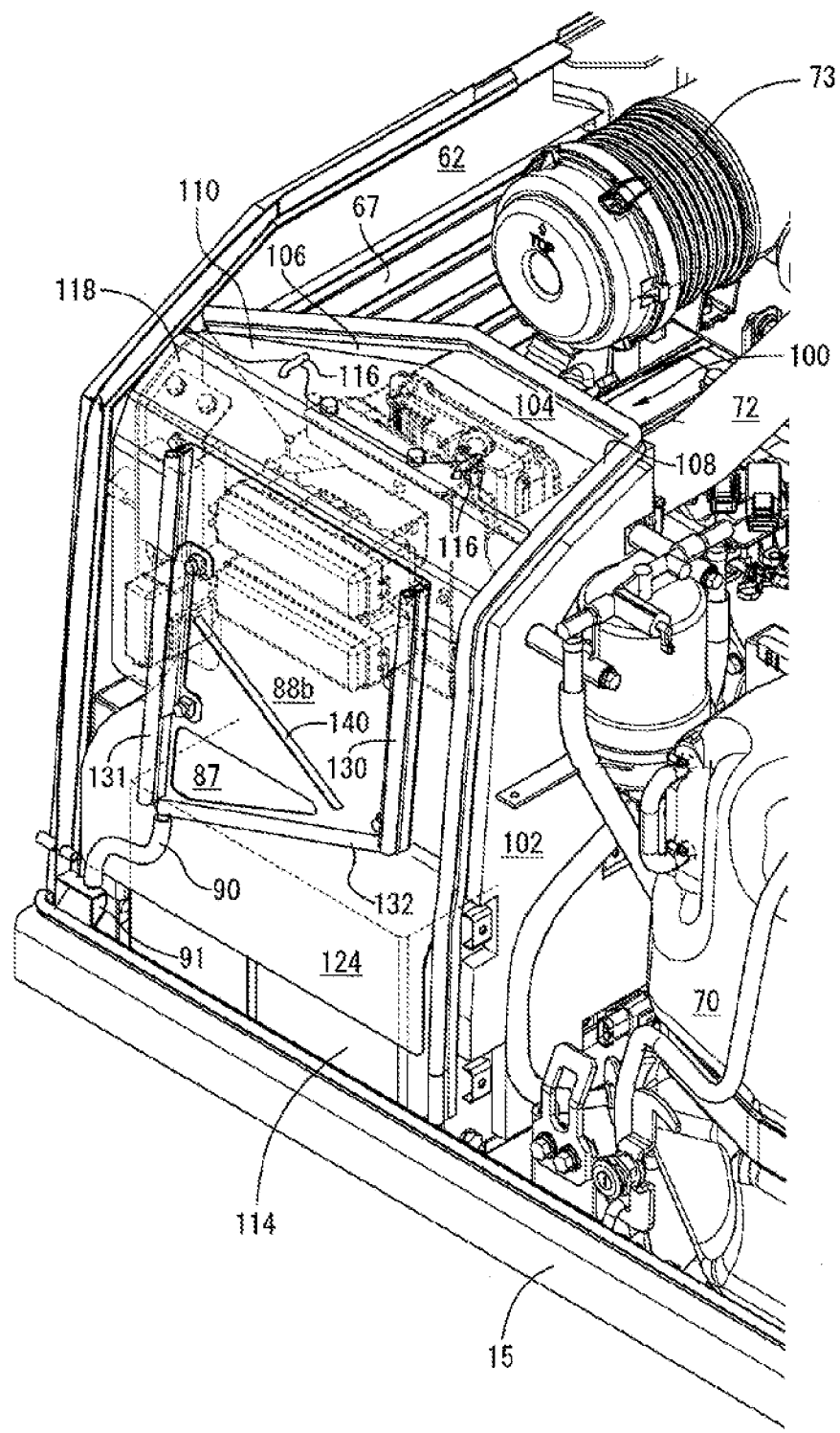
FIG. 8 An explanatory perspective view, viewed from the front top right, of the rear right portion of the prime motor unit according to the one embodiment of the present invention from which the fixed-side ceiling wall and the openable-side ceiling and right side wall are removed.
Figure 9:
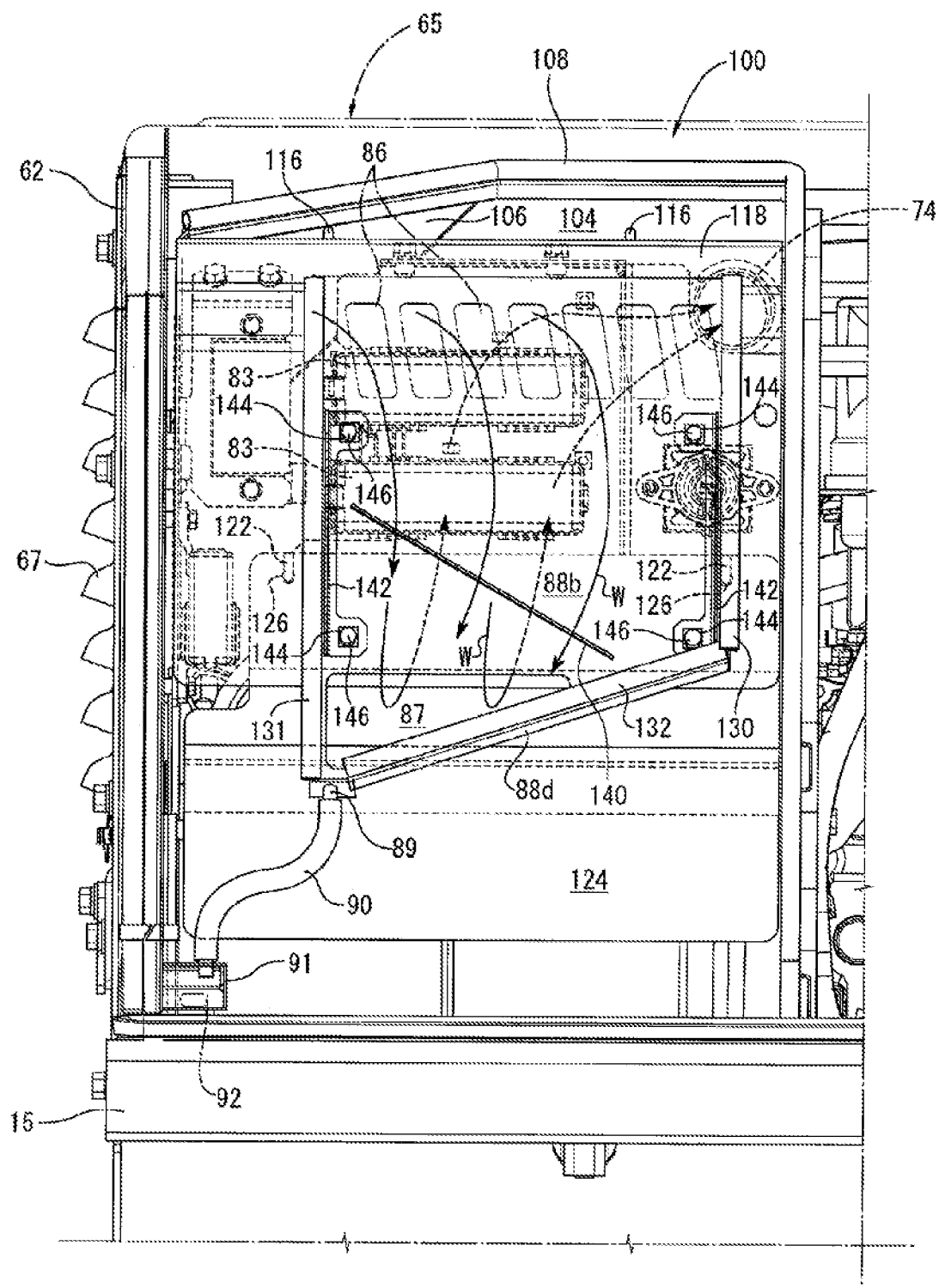
FIG. 9 An explanatory right-side view of a cooling air path in a placement space according to the one embodiment of the present invention.
Figure 10:
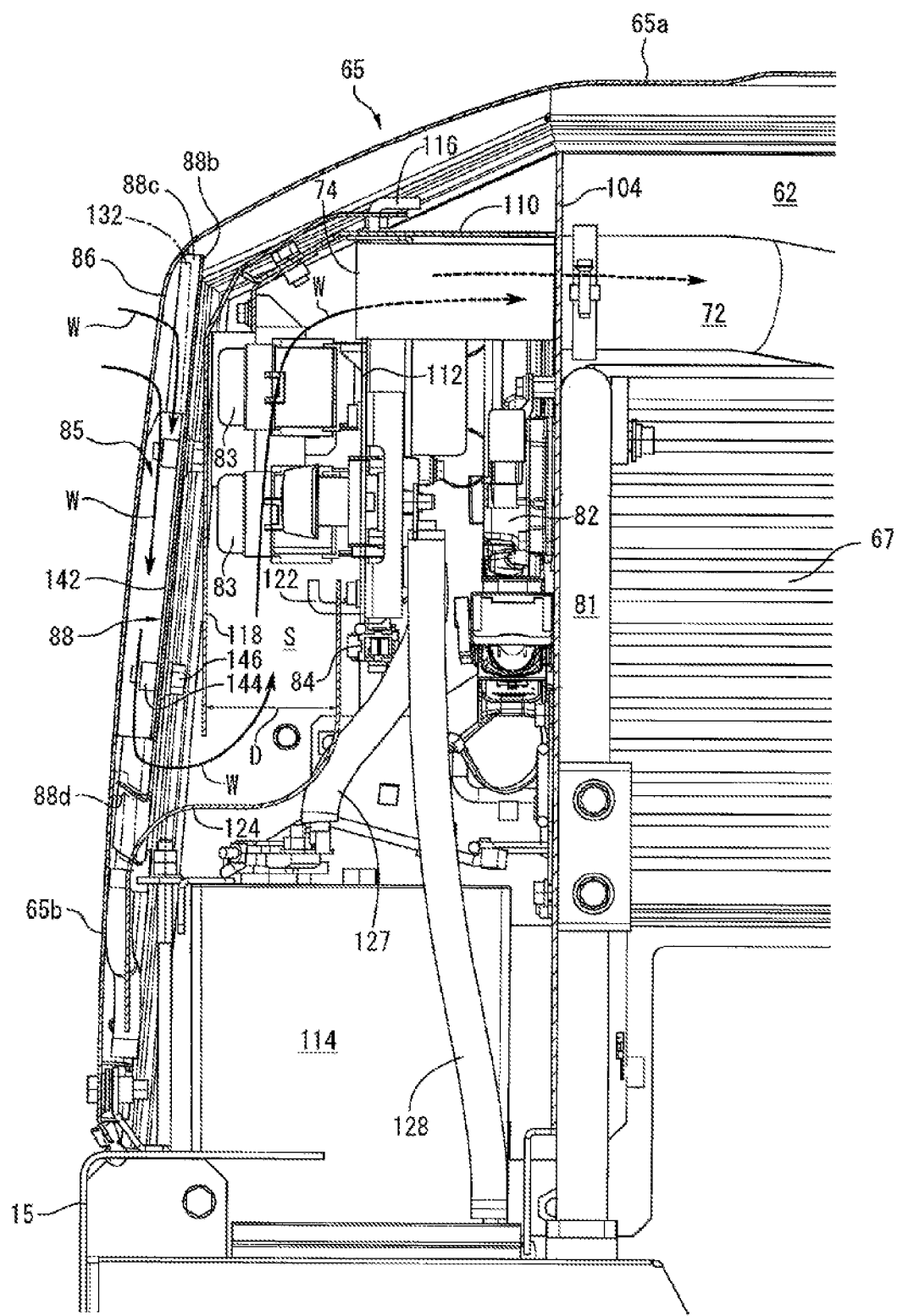
FIG. 10 An explanatory front view of the cooling air path in the placement space according to the one embodiment of the present invention.
Figure 11:
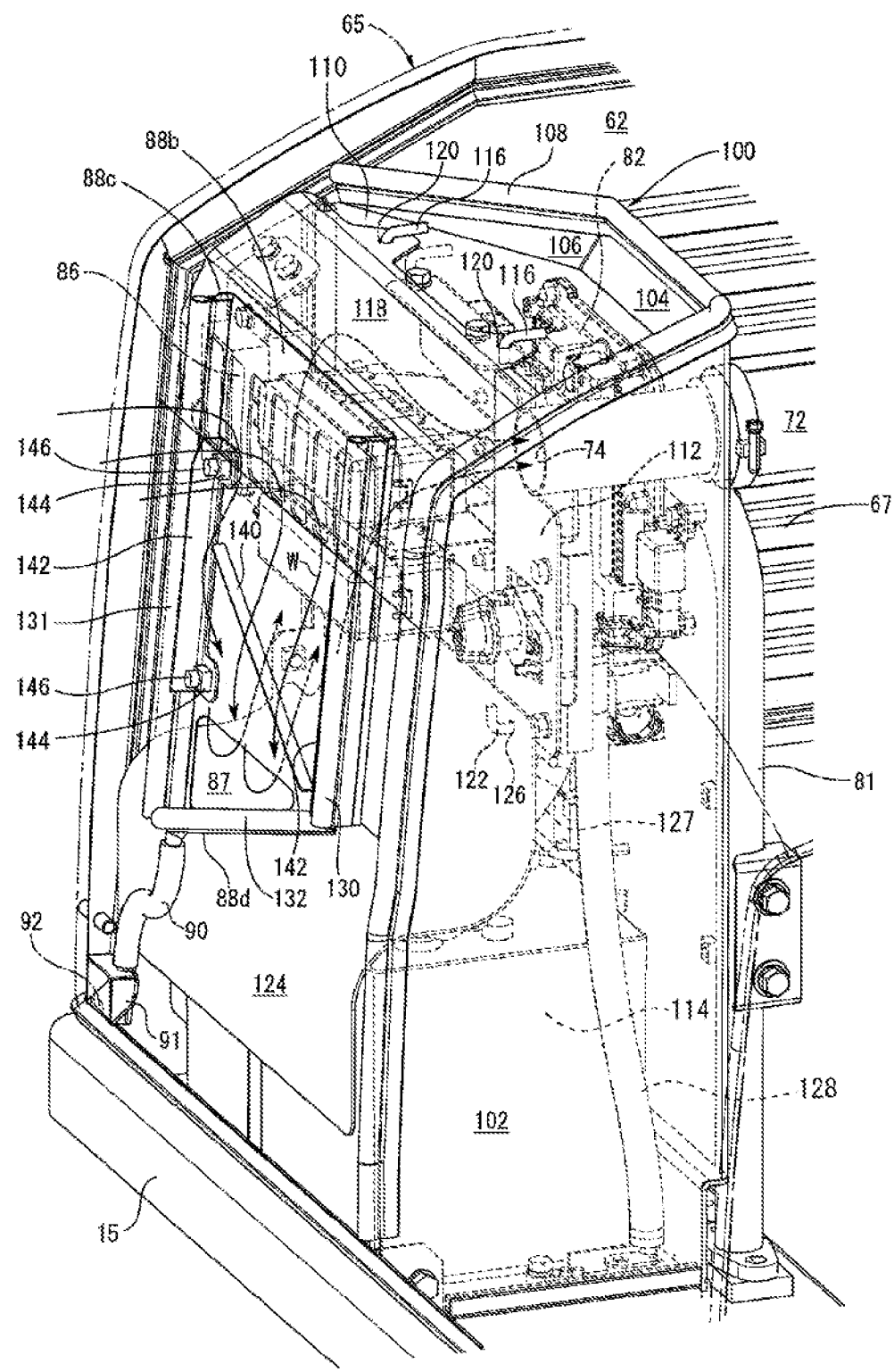
FIG. 11 An explanatory perspective view of the cooling air path in the placement space according to the one embodiment of the present invention.

As illustrated also in FIG. 7, the electrical unit 80 is placed on a portion of the overhung machine-body frame 15, the portion corresponding to a rear right portion of the space inside the hood 33. As illustrated in FIGS. 8 to 11, the electrical unit 80 includes electrical components such as a controller 82, a relay 83, and a fuse 84. The controller 82 has a function of controlling, e.g., a fuel injection amount and a fuel injection timing of the engine E and a timing at which the filter of the DPF 75 is burnt to regain its function.

As illustrated also in FIGS. 4 to 7, the hood 33 has a cap-shape which is opened downward and which is constituted by a front wall 61, a rear wall 62, a left side wall (inner wall) 63, a fixed-side ceiling wall 64 constituting a left side portion of a ceiling wall, and an openable-side ceiling and right side wall (openable lid) 65 constituting a right side portion of the ceiling wall (openable-side ceiling wall 65*a*) and a right side wall (outer side wall) 65*b*.

The front wall 61 has the front grille 66 through which outside air from the front is drawn. The rear wall 62 has a louver 67 through which exhaust heat and/or the like is discharged to the rear, i.e., to the outside of the hood 33. The left side wall (inner wall) 63 has a center upper portion in which a recess 34 for avoiding interference is formed. The right control part 52 is disposed close to the left side wall 63 such that interference of the right control part 52 with respect to the left side wall 63 is avoided by the recess 34. A horizontal support piece 69, which extends in the front-and-rear direction, is horizontally laid over a left side portion between the front wall 61 and the rear wall 62. The fixed-side ceiling wall 64 is fixedly and horizontally laid over a space between upper ends of the front wall 61, the rear wall 62, and the left side wall 63 and over a left side portion of an upper surface of the horizontal support piece 69. In the openable-side ceiling and right side wall 65, a left edge of the openable-side ceiling wall 65*a* is pivotally supported at a right side portion of the upper surface of the horizontal support piece 69 via a pivot support body (not illustrated), and the right side wall 65*b* has a lower portion provided with an opening-and-closing control part 68 (see FIG. 4). Thus, the openable-side ceiling and right side wall 65 functions as an openable lid. By operating the opening-and-closing control part 68, it is possible to open the openable-side ceiling and right side wall 65 upward so that the openable-side ceiling surface and the right side surface of the hood 33 can be opened simultaneously. An operational panel part 35 is provided above the fixed-side ceiling wall 64.

[Description of Characteristic Configuration of Construction Machine]

Next, with reference to FIGS. 4 to 11, the following will describe a characteristic configuration of the construction machine A configured as described above. Specifically, the space inside the hood 33 covering the engine E has a placement space S in which the electrical unit 80 is placed and which communicates with outside air. The distal-end opening 74 of the intake pipe 72 connected to the inlet port 71 of the engine E is placed in the placement space S to cause outside air sucked into the intake pipe 72 due to a suction pressure (negative pressure) occurred in the intake pipe 72 to pass through the placement space S to form a cooling air path W in the placement space S. In the cooling air path W, at least part (in the present embodiment, the relay 83 and the fuse 84) of the electrical unit 80 is placed. As a result, the placement space S is cooled by the cooling air, so that the electrical unit 80 is cooled directly inside the cooling air path W or indirectly outside the cooling air path W.

Here, the space inside the hood 33 has a high atmospheric temperature due to heat generated by the engine E. In order to deal with this, outside air is introduced into the placement space S, so that the cooling air path W for cooling the placement space S is formed. Devices having a working temperature range that is specified to be at a certain temperature or lower are collected in one place in the placement space S, so that these devices constitute the electrical unit 80. By disposing at least part of the electrical unit 80 in the cooling air path W, the electrical unit 80 can be reliably cooled by the cooling air. Consequently, an ambient temperature of the electrical unit 80 can be lowered to a temperature of 60° C. or less, and thus it is possible to prevent a situation that the electrical components constituting the electrical unit 80 erroneously operate due to heat. Furthermore, since the temperature in the placement space S can be made similar or equal to that of the outside air, it is possible to reduce the number of heat insulating materials to be used to thermally insulate the electrical components.

In the placement space S, an intake duct 85 having an outside-air inlet port 86 through which outside air is drawn and a communication port 87 disposed downward of the outside-air inlet port 86 is placed. The distal-end opening 74 of the intake pipe 72 is disposed upward of the communication port 87 to form the cooling air path W that is circuitous to cause the outside air drawn through the outside-air inlet port 86 to pass through the intake duct 85, to exit from the intake duct 85 through the communication port 87, and to be drawn upward into the distal-end opening 74 of the intake pipe 72. The electrical unit 80 is placed in a downstream portion of the cooling air path W, the downstream portion being located outside of the intake duct 85 and being in the placement space S. Furthermore, the electrical unit 80 is located upward from the communication port 87.

The placement space S is a part of the space (engine room) inside the hood 33, the part being partitioned by a partitioning wall 100 serving as an inner wall placed in the space inside the hood 33 and by a part of the hood 33 serving as an outer wall.

The intake duct 85 is shaped in a box (bottomed cylinder) which is vertically long in a top-and-bottom direction and which is constituted by a duct main piece 88 placed in the placement space S and by a part of the hood 33 serving as an outer side wall. Specifically, the intake duct 85 includes, as one of constituent elements thereof, the right side wall 65*b* of the openable-side ceiling and right side wall 65 of the hood 33, and is shaped in a thin box extending in the top-and-bottom direction along an inner surface of the right side wall 65*b*. Namely, the intake duct 85 is a part of the placement space S partitioned by the duct main piece 88 facing the right side wall 65*b* of the hood 33, and is a substantially flat space formed along an inner wall surface of the right side wall 65*b* and between the right side wall 65*b* and the duct main piece 88 facing each other. The intake duct 85 is constituted by the duct main piece 88 whose right end face is in contact with the inner surface of the right side wall 65*b*, the duct main piece 88 being shaped in a thin cap (tray) that is opened upward and rightward.

The outside-air inlet port 86 is formed in the part of the hood 33 serving as the outer side wall so that the outside-air inlet port 86 coincides with an upper portion of the duct main piece 88. Specifically, the outside-air inlet port 86 is located upward of the intake duct 85, and is formed in the right side wall 65*b* of the openable-side ceiling and right side wall 65. The communication port 87 is formed in a lower portion of a left side wall of the duct main piece 88, and is opened toward a side on which the electrical unit 80 is placed. Namely, in the placement space S, the communication port 87 allows a lower portion of the intake duct 85 partitioned by the duct main piece 88 to communicate with a part of the space opposite to the intake duct 85 across the duct main piece 88.

The duct main piece 88 has a bottom including a draining hole 89 (see FIG. 9) for discharging rainwater and/or the like having entered the intake duct 85 through the outside-air inlet port 86. The draining hole 89 is located downward of the communication port 87. The inner surface of the right side wall 65*b* has a rear lower portion provided with a water discharging part 91 shaped in a box whose right side is opened. The draining hole 89 is connected to a proximal end (upper end) of a draining pipe 90 at a lower side of the duct main piece 88. Meanwhile, the water discharging part 91 is connected to a distal end (lower end) of the draining pipe 90 extended downward. The right side wall 65*b* has a discharge hole 92 at a location coinciding with a plane of the opening of the water discharging part 91. Through the discharge hole 92, rainwater and/or the like is discharged to the outside of the machine. In the above-described manner, the intake duct 85, the draining pipe 90, and the water discharging part 91 are attached integrally to the openable-side ceiling and right side wall 65.

To be more specific, the placement space S in which the electrical unit 80 is placed is located in a right rear portion of the space inside the hood 33, and is formed by the partitioning wall 100 provided on the overhung machine-body frame 15 in a standing manner, the rear wall 62, and the openable-side ceiling and right side wall 65. Closing the openable-side ceiling and right side wall 65 brings the placement space S into a closed state. Meanwhile, opening the openable-side ceiling and right side wall 65 brings the placement space S into a state in which an upper side and a right side of the placement space S are opened.

The partitioning wall 100 is supported in a standing state by a support 81 attached to the overhung machine-body frame 15 in a standing manner. The partitioning wall 100 is constituted by a partitioning-wall front piece 102 standing to face the fuel tank 70, a partitioning-wall side piece 104 standing to face the engine E with a front edge of the partitioning-wall side piece 104 being connected to a left edge of the partitioning-wall front piece 102, and a partitioning-wall rear piece 106 standing with a front edge of the partitioning-wall rear piece 106 being connected to a rear edge of the partitioning-wall side piece 104 and a rear edge of the partitioning-wall rear piece 106 being in contact with a right side of the rear wall 62. The partitioning-wall front piece 102, the partitioning-wall side piece 104, and the partitioning-wall rear piece 106 have respective upper edges formed along an inner surface of the openable-side ceiling and right side wall 65 being in a closed state. In addition, a wall sealing material 108 is attached to these upper edges and to a right edge of the partitioning-wall front piece 102. Consequently, the inner surface of the openable-side ceiling and right side wall 65 being in a closed state is in close contact with the partitioning wall 100 via the wall sealing material 108.

To the partitioning-wall side piece 104, a left side surface of the controller 82, which is thin in the left-and-right direction, is attached such that the left side surface of the controller 82 and the partitioning-wall side piece 104 face each other. A ceiling surface 110 is stretched over a space above the partitioning-wall front piece 102, the partitioning-wall side piece 104, and the partitioning-wall rear piece 106. The ceiling surface 110 has a left side portion that is horizontal and a right side portion that is downwardly inclined toward the right side. Below the ceiling surface 110, a suspended support 112 is disposed. The suspended support 112 is located on the right side of the controller 82, and has side surfaces respectively facing rightward and leftward. The suspended support 112 has a plate-shape, and is suspended vertically downward. On the right side surface of the suspended support 112, components such as the relay 83 and the fuse 84 are attached and arranged at intervals in the top-and-bottom direction. A battery 114 is placed on a portion of the overhung machine-body frame 15, the portion being inside the placement space S. A distal end of the intake pipe 72 penetrates through an upper front portion of the partitioning-wall side piece 104 such that the distal end of the intake pipe 72 extends horizontally from the left side to the right side directly below the ceiling surface 110. In addition, the distal-end opening 74 is opened toward the right side, at a location just in front of the suspended support 112. A first harness 127 is provided above the battery 114, and a second harness 128 is provided to extend upward from a position in front of the battery 114.

The ceiling surface 110 has an upper surface from which a pair of front and rear upper locking pins 116 is protruded. The upper locking pins 116 are engaged with a pair of front and rear locking holes 120 formed in an upper edge portion of an upper hung screen 118 for waterproofing. The upper hung screen 118 is made of a waterproof material and is shaped in a sheet having a width substantially identical to a width of the placement space S in the front-and-rear direction. The upper hung screen 118 is suspended at a location on the right side of components such as the relay 83 and the fuse 84. The upper hung screen 118 has a lower edge positioned in the vicinity of an upper edge of the communication port 87.

The right side surface of the suspended support 112 is provided with a pair of front and rear lower locking pins 122 protruding therefrom. A lower hung screen 124 for waterproofing is locked and supported by the lower locking pins 122. The lower hung screen 124 has an upper edge in which a pair of front and rear lower locking holes 126 is formed. The lower locking holes 126 are respectively engaged with the lower locking pins 122. The lower hung screen 124 is made of a waterproof material and is shaped in a sheet having a width substantially identical to the width of the placement space S in the front-and-rear direction. The lower hung screen 124 is suspended to cover a portion of the battery 114, the portion extending from a right side portion of an upper surface of the battery 114 to an upper portion of a right side surface of the battery 114.

A lower portion of the upper hung screen 118 and an upper portion of the lower hung screen 124 are spaced apart at a certain interval D in the left-and-right direction (see FIG. 10), and are disposed to overlap each other in the left-and-right direction. Consequently, the downstream portion of the cooling air path W extending in top-and-bottom direction is formed. Thus, outside air drawn through the communication port 87 is guided inward and upward by an intermediate portion of the lower hung screen 124. The outside air thus guided inward and upward is guided vertically upward by the lower portion of the upper hung screen 118 and the upper portion of the lower hung screen 124. The outside air thus guided vertically upward is guided further upward by the upper hung screen 118. Consequently, the outside air is reliably sucked into the distal-end opening 74 of the intake pipe 72. Since the electrical unit 80 is disposed in the downstream portion of the cooling air path W extending in the top-and-bottom direction, the electrical unit 80 is cooled by the outside air guided upward. Particularly, since the relay 83 and the fuse 84 are disposed between the intake duct 85 into which the outside air is taken and the distal-end opening 74 of the intake pipe 72 into which the outside air is sucked when viewed in the front view illustrated in FIG. 10, the relay 83 and the fuse 84 are reliably cooled. Meanwhile, although the controller 82 is disposed leftward of the distal-end opening 74 of the intake pipe 72 into which the outside air is sucked, the controller 82 is reliably cooled, since the whole of the placement space S serves as the cooling air path W due to the flow of the outside air.

The duct main piece 88 of the intake duct 85 is constituted by a duct front wall 88a extending in the top-and-bottom direction and having a narrow width in the left-and-right direction, a duct side wall 88b having a front edge connected to a left side edge of the duct front wall 88a and having a pentagonal shape in a side view, a duct rear wall 88c having a left side edge connected to a rear edge of the duct side wall 88b, extending in the top-and-bottom direction, and having a narrow width in the left-and-right direction, and a duct bottom 88d having a left side edge connected to a lower edge of the duct side wall 88b, extending in the front-and-rear direction, and having a narrow width in the left-and-right direction. The duct rear wall 88c is long and has a lower edge located downward of a lower edge of the duct front wall 88a. The duct side wall 88b has the lower edge inclined to be higher in the front and lower in the rear, so that the duct bottom 88d, which is connected to the lower edge of the duct side wall 88b, has an inclined posture with which the duct bottom 88d becomes higher in the front and lower in the rear. The duct bottom 88d has a front edge connected to a lower edge of the duct front wall 88a, and has a rear edge connected to a lower edge of the duct rear wall 88c. The duct front wall 88a and the duct rear wall 88c have right edges to which a front-wall duct sealing material 130 and a rear-wall duct sealing material 131 are attached, respectively. The duct bottom 88d has a right edge to which, except for a rear edge thereof, a bottom duct sealing material 132 is attached. Thus, a space is given between a lower edge of the rear-wall duct sealing material 131 and a rear edge of the bottom duct sealing material 132.

The duct side wall 88b has a right side surface including an intermediate portion provided with a rainwater guide piece 140 protruding therefrom. The rainwater guide piece 140 extends in the front-and-rear direction, and is inclined to be lower in the front and higher in the rear. Consequently, along an upper surface of the rainwater guide piece 140, rainwater is guided to flow downward. The communication port 87 is located in a lower portion of the duct side wall 88b, which is located downward of the rainwater guide piece 140. At the location, the communication port 87, which is shaped in a triangle, is opened in the left-and-right direction. The communication port 87 has an upper edge that is horizontal and a lower edge that is inclined along the duct bottom 88d.

To the right side wall 65b of the openable-side ceiling and right side wall 65, a pair of front and rear attachment brackets 142 extending in the top-and-bottom direction is attached. From the left side of the duct side wall 88b, male screw bolts 146 are penetrated through female screw bolts 144 attached to the attachment brackets 142, and the male screw bolts 146 are screwed with the female screw bolts 144. Consequently, the duct main piece 88 is attached to the right side wall 65b, so that the intake duct 85 is formed. At this time, the front-wall, rear-wall, and bottom duct sealing materials 130, 131, and 132 attached to the right edges of the duct front wall 88a, the duct rear wall 88c, and the duct bottom 88d are pressed onto the right side wall 65b of the openable-side ceiling and right side wall 65 so as to be deformed. Consequently, the front-wall, rear-wall, and bottom duct sealing materials 130, 131, and 132 are in close contact with the right side wall 65b. The right side wall 65b has an upper portion including the outside-air inlet port 86. The outside-air inlet port 86 includes multiple outside-air inlet ports (in the present embodiment, seven outside-air inlet ports) each of which is shaped in a vertically long rectangle and which are arranged at intervals in the front-and-rear direction. The duct bottom 88d, which is inclined to be higher in the front and lower in the rear, has a rear portion including the draining hole 89.

With the intake duct 85 configured as above, an internal pressure of the placement space S is at a negative pressure due to the distal-end opening 74 of the intake pipe 72 connected to the inlet port 71 of the engine E. This provides an upstream portion of the cooling air path W along which outside air is taken through the outside-air inlet port 86, the outside air is guided to flow downward, and the outside air flows into the placement space S through the communication port 87. In the placement space S, the downstream portion of the cooling air path W is provided as described above, and thus the electrical unit 80 is cooled by cooling air. During this, rainwater and/or the like taken into the intake duct 85 through the outside-air inlet port 86 together with outside air is guided to flow downward along the upper surface of the rainwater guide piece 140, flows downward from a front edge of the rainwater guide piece 140 to a front edge of an upper surface of the duct bottom 88d, and is then guided rearward and downward along the upper surface of the duct bottom 88d. Then, the rainwater and/or the like having reached a rear edge of the duct bottom 88d passes through the draining hole 89, the draining pipe 90, the water discharging part 91, and the discharge hole 92 in this order, and is then discharged to the outside of the machine.

As described above, outside air having flowed into the intake duct 85 is taken, through the communication port 87 disposed downward of the electrical unit 80, into a portion of the placement space S that is outside of the intake duct 85, i.e., a portion of the placement space S that is inward from the intake duct 85 across the duct main piece 88. Thus, rainwater and/or the like having flowed into the intake duct 85 together with the outside air is discharged through the draining hole 89 located downward of the communication port 87. This can eliminate or reduce the possibility that rainwater and/or the like may give an adverse effect on the electrical unit 80 and/or the possibility that rainwater and/or the like may be sucked into the intake pipe 72. Furthermore, even if a washing fluid enters the placement space S during washing of the construction machine A, malfunctioning or the like of the electrical unit 80 caused by the washing fluid can be prevented, thanks to the partitioning wall 100 and the upper and lower hung screens 118 and 124 for waterproofing, with which the electrical unit 80 is covered.

REFERENCE SIGNS LIST

A construction machine
S placement space
W cooling air path
72 intake pipe
80 electrical unit
85 intake duct
86 outside-air inlet port
87 communication port

The invention claimed is:

1. A construction machine comprising:
an engine; and
a hood covering the engine;
wherein:
a space inside the hood has a placement space which communicates with outside air;
a distal-end opening of an intake pipe connected to an inlet port of the engine is disposed in the placement space to cause outside air sucked into the intake pipe due to a suction pressure occurred in the intake pipe to pass through the placement space to form a cooling air path in the placement space;
an intake duct having an outside-air inlet port through which outside air is drawn and a communication port disposed downward of the outside-air inlet port is placed in the placement space;
the distal-end opening of the intake pipe is disposed upward of a communication port that is disposed downward of the outside-air inlet port is placed in the placement space to form the cooling air path that is circuitous to cause the outside air drawn through the outside-air inlet port to pass through the intake duct, to exit from the intake duct through the communication port, and to be drawn upward into the distal-end opening of the intake pipe.

2. The construction machine according to claim 1, wherein:
an electrical unit is placed in the placement space in a downstream portion of the cooling air path, the downstream portion being located outside of the intake duct.

3. The construction machine according to claim 1, wherein:
the placement space is a part of the space inside the hood, the part being partitioned by a partitioning wall serving as an inner wall placed in the space inside the hood and by a part of the hood serving as an outer wall;
the intake duct is shaped in a box which is vertically elongated in a top-and-bottom direction and which is constituted by a duct main piece placed in the placement space and by a part of the hood serving as an outer side wall;
the outside-air inlet port is formed in the part of the hood serving as the outer side wall so that the outside-air inlet port coincides with an upper portion of the duct main piece, the communication port is formed in a lower portion of the duct main piece; and
the distal-end opening of the intake pipe penetrates through an upper portion of the partitioning wall to be disposed in the placement space.

4. The construction machine according to claim 2, wherein the communication port is opened toward the electrical unit placed in the placement space.

5. The construction machine claim 1, wherein the intake duct has a bottom including a draining hole for discharging rainwater having entered the intake duct through the outside-air inlet port.

6. A construction machine comprising:
a hood defining a cavity and an outside-air inlet port;
at least one wall configured to define a duct in fluid communication with the outside-air inlet port, the duct defining a first opening, the first opening positioned in the cavity and below the outside-air inlet port;
an intake pipe coupled to an engine and defining a second opening, the second opening positioned in the cavity and above the first opening defined by the duct; and
wherein the engine draws air into the outside-air inlet port, through the duct, through the first opening and into the second opening.

7. The construction machine of claim 6, wherein:
the duct comprises an intake duct.

8. The construction machine of claim 7, wherein:
the intake duct is in fluid communication with the first opening.

9. The construction machine of claim 6, further comprising:
the engine positioned in the cavity.

10. The construction machine of claim 6, wherein:
an electrical unit is positioned in the cavity between the first opening and the second opening.

11. The construction machine of claim 6, further comprising:
a set of one or more walls configured to define a first sub-chamber of the cavity.

12. The construction machine of claim 11, wherein:
the first sub-chamber is in fluid communication with the first opening.

13. The construction machine of claim 11, wherein:
the set of one or more walls and the at least one wall each include a first common wall.

14. The construction machine of claim 13, wherein:
the first common wall is interposed between the duct and the first sub-chamber of the cavity.

15. The construction machine of claim 13, wherein:
the first common wall comprises the first opening.

16. The construction machine of claim 13, wherein:
a second wall of the one or more walls defining the first sub-chamber divides the cavity into, and is positioned between, the first sub-chamber and a second sub-chamber of the cavity.

17. The construction machine of claim 6, further comprising:
a wall positioned in the cavity and configured to define a first sub-chamber of the cavity and a second sub-chamber of the cavity.

18. The construction machine of claim 17, wherein:
the intake pipe extends from the second sub-chamber, through the wall, and into the first sub-chamber.

19. The construction machine of claim 17, wherein:
the intake pipe is in fluid communication with the first sub-chamber.

20. The construction machine of claim 17, further comprising:
an electrical unit positioned in the first sub-chamber the engine positioned in the second sub-chamber.

* * * * *